United States Patent
Christensen et al.

(10) Patent No.: US 7,616,558 B2
(45) Date of Patent: Nov. 10, 2009

(54) REDUCTION OF THE TRANSPORT CAPACITY OF A VIRTUAL CONCATENATION GROUP

(75) Inventors: Anne Christensen, Allerod (DK); Flemming Gerdstrom, Bagsværd (DK)

(73) Assignee: Tellabs Operations, Inc., Naperville, IL (US)

(*) Notice: Subject to any disclaimer, the term of this patent is extended or adjusted under 35 U.S.C. 154(b) by 559 days.

(21) Appl. No.: 11/291,463

(22) Filed: Nov. 30, 2005

(65) Prior Publication Data

US 2006/0140225 A1 Jun. 29, 2006

(30) Foreign Application Priority Data

Dec. 23, 2004 (EP) ................................. 04388095

(51) Int. Cl.
*H04L 1/16* (2006.01)
*G01R 31/08* (2006.01)
*G06F 11/00* (2006.01)

(52) U.S. Cl. ........................................... 370/221; 714/2
(58) Field of Classification Search ................. 370/230, 370/241, 395.5, 395.51, 395.53, 431, 465–467
See application file for complete search history.

(56) References Cited

U.S. PATENT DOCUMENTS

| | | | |
|---|---|---|---|
| 7,058,008 B1* | 6/2006 | Wilson et al. | 370/216 |
| 2004/0076176 A1* | 4/2004 | Kfir | 370/465 |
| 2004/0120362 A1 | 6/2004 | Chohan et al. | |
| 2004/0252633 A1* | 12/2004 | Acharya et al. | 370/216 |
| 2005/0047419 A1* | 3/2005 | Green | 370/395.51 |
| 2006/0018324 A1* | 1/2006 | Nisar et al. | 370/395.51 |
| 2006/0041826 A1* | 2/2006 | Bhattacharya et al. | 714/782 |

FOREIGN PATENT DOCUMENTS

EP 1 343 263 A2 9/2003
EP 1 343 263 A3 9/2003

OTHER PUBLICATIONS

Acharya, S. et al., "PESO: Low Overhead Protection for Ethernet over SONET Transport," *Infocom 2004, 23rd Annual Joint Conference of the IEEE Computer and Communications Societies,* IEEE vol. 1, Mar. 2004 (pp. 165-175).

(Continued)

*Primary Examiner*—Seema S Rao
*Assistant Examiner*—Xavier Szewai Wong
(74) *Attorney, Agent, or Firm*—Hamilton, Brook, Smith & Reynolds, P.C.

(57) ABSTRACT

The transport capacity of a Virtual Concatenation Group (VCG) can be reduced under control of a Link Capacity Adjustment Scheme (LCAS). The VCG comprises link members, in which payload data are transmitted. A first control message comprising a fail message ($R_{FAIL}$) for a link member is transmitted from sink to source, while the sink continues reception of payload data. On reception of the first control message at the source, a second control message is transmitted comprising a message ($F_{DNU}$) indicating that payload data of the link member shall not be used, and transmission of payload data is discontinued. On reception of the second control message at the sink reception of payload data is discontinued, and the link member is removed. This allows a reduction of the transport capacity of a Virtual Concatenation Group to be performed in a hitless manner, even when initiated at the sink side.

12 Claims, 7 Drawing Sheets

OTHER PUBLICATIONS

"Link capacity adjustment scheme (LCAS) for virtual concatenated signals," ITU-T G.7042/Y.1305, Feb. 2004, pp. 1-23.

"Link capacity adjustment scheme (LCAS) for virtual concatenated signals, Corrigendum 1" ITU-T G.7042/Y.1305, Aug. 2004, pp. 1-14.

* cited by examiner

REDUCTION OF THE TRANSPORT CAPACITY OF A VIRTUAL CONCATENATION GROUP

RELATED APPLICATION

This application claims priority under 35 U.S.C. § 119 or 365 to European Patent Application No. 04388095.4, filed Dec. 23, 2004, the entire teachings of which are incorporated herein by reference.

FIELD OF THE INVENTION

The invention relates to a method of reducing the transport capacity of a Virtual Concatenation Group that is transported from a source side to a sink side in a telecommunications network under control of a Link Capacity Adjustment Scheme, wherein said Virtual Concatenation Group comprises a number of link members, in which payload data to be received at the sink side can be transmitted. The invention further relates to a network element adapted to function as a sink side in a telecommunications network, and to a corresponding computer program and computer readable medium.

BACKGROUND OF THE INVENTION

Generic transport networks, such as OTN (Optical Transport Network), SDH (Synchronous Digital Hierarchy) or SONET (Synchronous Optical NETwork) networks, are widely used for transmission of large data streams (e.g. a large number of telephone channels) between network elements in the telecommunications networks. These synchronous systems also allow the transmission of asynchronous signals, e.g. signals from a PDH (Plesiochronous Digital Hierarchy) with data rates of 140 Mbit/s, 34 Mbit/s or 2 Mbit/s, which may be mapped into e.g. a SDH system.

International standards prescribe how to place the individual bytes in the frames of the synchronous system. A detailed structure shows how this mapping is made. In the SDH system the payload data signals are placed together with overhead signals in so-called virtual containers, which may be higher order virtual containers, e.g. VC-4, or lower order virtual containers, e.g. VC-12 or VC-3.

SDH signals are a serial flow of logical 1's and 0's that may be subdivided into a sequence of bytes of 8 bits each. The signals are structured such that the transmitted bit flow may be subdivided into a plurality of channels for different applications. The basic structure of an SDH signal is a so-called Synchronous Transport Module at level 1 (STM-1), which may be considered as a frame having 9 rows and 270 bytes in each row. Of the 270 bytes the first nine bytes in each row are used for overhead and pointers, so that 261 bytes in each row constitute the transport capacity of the frame. An STM-1 frame is transmitted with a data rate of 155.52 Mbit/s. Corresponding STM frames of higher order (STM-N) also exist, and these are transmitted with corresponding higher data rates. As examples, STM-4, STM-16, STM-64 and STM-256 are specified.

The signals are transmitted one row at a time with the uppermost row first, and each row is transmitted from the left to the right. Each byte is transmitted with the most significant bit first. The transport capacity of the STM-1 frame, i.e. the 9 rows of 261 bytes each, constitutes a higher order virtual container VC-4. The payload capacity of a VC-4 is 149.76 Mbit/s. For the lower order virtual containers, which may be mapped into the VC-4, the payload capacity is 49.536 Mbit/s for the VC-3 and 2.176 Mbit/s for the VC-12.

These bit rates are well suited for transporting e.g. PDH signals, which, as mentioned, the SDH system is frequently used for. In that case a VC-4 may e.g. contain a PDH channel of 140 Mbit/s, or it may be subdivided into a plurality of smaller virtual containers. It may e.g. contain 3 VC-3s each transporting a PDH channel of 34 Mbit/s or 63 VC-12s each transporting a PDH channel of 2 Mbit/s.

However, many services or data types require bit rates, which cannot utilize the possible bit rates of the virtual containers effectively. As an example, a data rate of 10 Mbit/s is required, when Ethernet data are transmitted through an SDH network. The smallest virtual container that will accommodate a 10 Mbit/s payload is a VC-3, which means that the transport efficiency is as low as 20%. Other data types with poor transport efficiencies in SDH are Fast Ethernet, ESCON, Fibre Channel and Gigabit Ethernet. The transport efficiency for such data types may be improved by concatenating virtual containers. Two types of concatenation exist, contiguous concatenation and virtual concatenation.

Contiguous concatenation is used when payloads greater than the capacity of e.g. a VC-4 is to be transmitted. In that case several containers may be locked to each other so that the concatenated containers are transmitted together through the network, in which the relevant network elements must be set up by the management system to handle the concatenated containers. As examples of contiguous concatenated containers, VC-4-4c, VC-4-16c and VC-4-64c can be mentioned. These containers can be transmitted in STM-4, STM-16 and STM-64 frames.

By virtual concatenation, the payload may be divided between a number of virtual containers in a more flexible way. For instance, Ethernet data of 10 Mbit/s may be transmitted in 5 VC-12 containers. Although the 5 containers constitute a Virtual Concatenation Group (VCG), they are transmitted as individual containers through the network, so that by virtual concatenation, there are no special requirements on the existing network elements or strict routing constraints for the network. The virtual containers of a VCG are also called the members of the group. In the receiving network element the virtual containers of the VCG can be recognized on their overhead, and a differential delay caused by difference in (optical) path length can be compensated, so that the data of the 5 containers can be combined again. Thus by means of virtual concatenation the transport efficiency is improved considerably, and network operators can implement connections that are more appropriate for the above-mentioned services by providing a much more flexible bandwidth granularity. Further, virtual concatenation is transparent to intermediate network elements, which means that it can be implemented without the need for any upgrade of the existing network elements.

Many of these services have variable requirements for bandwidth over time, and thus there is a need to be able to increase or decrease the capacity of a VCG link by adding or removing members from the group in order to meet the bandwidth needs of the application. The capacity of the VCG should be increased or decreased hitless, where a hit is a situation in which loss of data occurs. Further, in case a failure is experienced in the link for a member in the network, the transmission capacity needs to be decreased to avoid that the whole VCG fails. These functions can be handled by the Link Capacity Adjustment Scheme (LCAS) for virtual concatenated signals as specified by the ITU-T Recommendation G.7042/Y.1305. This Recommendation defines the required states at the source and at the sink side of the link as well as the control information exchanged between both the source and the sink side of the link to enable the flexible resizing of the virtual concatenated signal.

In LCAS, synchronization of changes in the capacity of the transmitter (source side) and the receiver (sink side) is achieved by control packets. Each control packet describes the state of the link during the next control packet. Changes are sent in advance so that the receiver can switch to the new configuration at a predefined time. The control packet consists of fields dedicated to specific functions. Control packets contain information sent from source to sink, i.e. the forward direction, and from sink to source, i.e. the return direction. The information in the forward direction comprises a control field providing commands indicating the status of the individual members of the group. The information in the return direction comprises an MST (Member Status) field, which reports the member status from sink to source with the two possible states OK and FAIL.

The network elements of a link are controlled by one or more management systems. The management system can instruct the end network elements, i.e. source or sink side, to add members to or remove members from the group. This is done by sending management messages.

The three main functions of the LCAS is to increase the VCG capacity by the addition of members, to decrease the VCG capacity by temporary removal of members due to a failure, and to decrease the VCG capacity by permanent removal of members due to a change in the bandwidth needs of the application.

When members are removed permanently to adapt the VCG capacity to the bandwidth needs of the application, three operations are required, i.e. the VCG size is reduced at the source end, the physical connection is removed between the source and the sink end, and the VCG size is reduced at the sink end. The LCAS Recommendation states that although a VCG capacity decrease can be initiated at either end by sending a management message from the management system, a planned VCG capacity reduction will only be hitless when the decrease is initiated at the source, i.e. the VCG size is first reduced at the source end. In this case a command indicating that the member is to be removed is sent from the source, and the payload data are removed from the following frames. If, on the other hand, a permanent removal of an active member is initiated at the sink side, this will result in a hit to the reconstructed data, because the source end will continue to send payload data on this member until it finds out that the member can not be used any longer.

For a unidirectional link this is not a problem. The network and element management system just has to ensure that the VCG capacity decrease is initiated at the source side. However, in practice, transmission networks are typically operated and configured bidirectionally, so that at least for most links payload data are transmitted in both directions. This means that a given network element will be the source for transmission in one direction and the sink for transmission in the other direction. If the network and element management system instructs this element to decrease the VCG capacity, this can only be done in a hitless manner for the transmission direction in which that element is the source. In the other direction the element would have to wait for the other end to reduce the VCG size before it can reduce the VCG size itself, if traffic hits shall be avoided. This is not always possible. It is especially a problem when the two network elements connected by the link belong to different operator domains, or if they are for any other reason managed by different network and element management systems.

SUMMARY OF THE INVENTION

Therefore, it is an object of the invention to provide a method of reducing the transport capacity of a Virtual Concatenation Group, in which the reduction can be done in a hitless manner, even when the reduction is initiated at the sink side of the link.

According to the invention the object is achieved in that the method comprises the steps of transmitting a first control message from the sink side to the source side comprising a fail message for one of said link members, while continuing reception of payload data for said one link member; receiving said first control message at the source side and transmitting in response a second control message from the source side to the sink side comprising a message indicating that payload data of said one link member shall not be used, while discontinuing transmission of payload data for said one link member; and receiving said second control message at the sink side, and, in response thereto, discontinuing the reception of payload data for said one link member and removing or disabling said one link member from said Virtual Concatenation Group on the sink side.

When the sink side sends the fail message without discontinuing the reception of payload data for the link to be removed, the transmission of payload data from the source can be stopped before the reception is discontinued on the sink side. In this way it is ensured that all payload data are received without hits. When the data transmission has been discontinued, the link member can be safely removed at the sink end.

When the method further comprises the steps of activating a timing circuit in response to the transmission of said first control message; providing, if said second control message is not received at the sink side within a specified time, a time-out signal from said timing circuit; and in response to said time-out signal, discontinuing the reception of payload data for said one link member and removing or disabling said one link member from said Virtual Concatenation Group on the sink side, it is ensured that after a certain time the link member can be removed on the sink side even if the source side has not responded, so that a dead-lock situation is avoided. If the source has not responded after a certain time, it can be assumed that the source end has failed (or there is some other fault in the connection), and then the sink end member can be removed anyway.

In an expedient embodiment, the method further comprises the step of initiating the transmission of said first control message by transmitting a command from a management system to the sink side, said command instructing the sink side to remove said one link member from said Virtual Concatenation Group on the sink side. Further, the first control message may be a return control message and the second control message may be a forward control message.

Expediently, the telecommunications network can be a Synchronous Digital Hierarchy (SDH) network, or it can be an Optical Transport Network (OTN). Alternatively, it can be a Synchronous Optical NETwork (SONET).

As mentioned, the invention further relates to a network element adapted to function as a sink side in a telecommunications network, in which a Virtual Concatenation Group can be transported from a source side to said sink side under control of a Link Capacity Adjustment Scheme, wherein said Virtual Concatenation Group comprises a number of link members, in which payload data to be received at the sink side can be transmitted. When the network element is arranged to transmit a first control message comprising a fail message for one of said link members to the source side, while continuing reception of payload data for said one link member; receive in response to said first control message a second control message from the source side comprising a message indicating that payload data of said one link member shall not be used; and in response to said second control message, discontinue the reception of payload data for said one link member and remove or disable said one link member from said Virtual Concatenation Group, a network element is provided, which allows a reduction of the transport capacity of a Virtual Concatenation Group to be performed in a hitless manner, even when initiated at the sink side.

When the network element comprises a timing circuit arranged to be activated in response to the transmission of said first control message and to provide a time-out signal, if said second control message is not received within a specified time; and that the network element is further arranged to; in response to said time-out signal, discontinue the reception of payload data for said one link member and remove or disable said one link member from said Virtual Concatenation Group, it is ensured that after a certain time the link member can be removed on the sink side even if the source side has not responded, so that a dead-lock situation is avoided. If the source has not responded after a certain time, it can be assumed that the source end has failed (or there is some other fault in the connection), and then the sink end member can be removed anyway.

In an expedient embodiment, the network element is further arranged to initiate the transmission of said first control message on reception of a command from a management system, said command instructing the sink side to remove said one link member from said Virtual Concatenation Group. Further, the network element may comprise a state machine having a state, which can be entered by the transmission of said first control message, and in which the machine is arranged to wait for the arrival of said second control message.

The first control message may be a return control message and the second control message may be a forward control message.

Expediently, the telecommunications network can be a Synchronous Digital Hierarchy (SDH) network, or it can be an Optical Transport Network (OTN). Alternatively, it can be a Synchronous Optical NETwork (SONET).

The invention also relates to a computer program and a computer readable medium with program code means for performing the method described above.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

Figure 1:
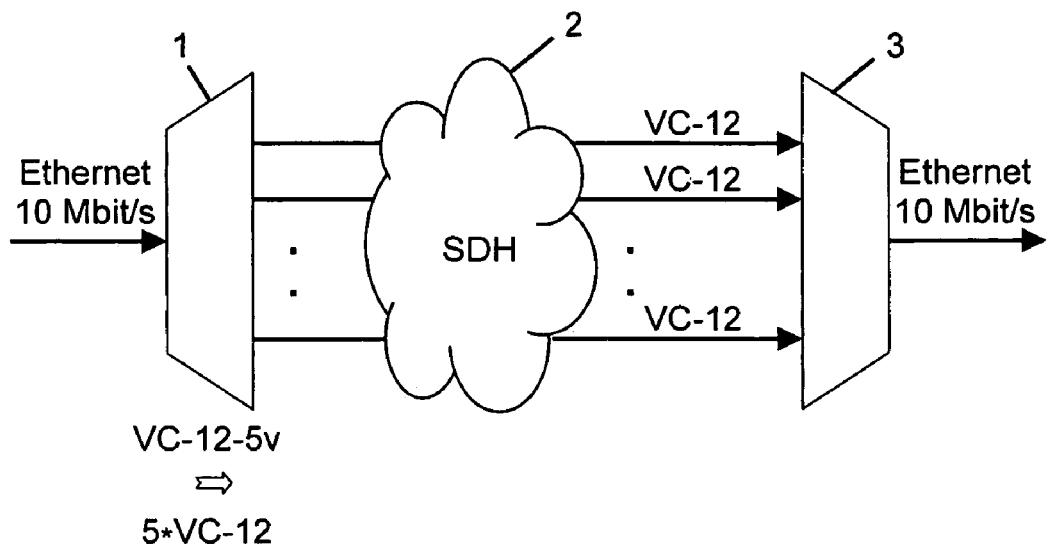
FIG. 1 shows an example of virtual concatenation used in an SDH network.

In FIG. 1 an example of the use of virtual concatenation is illustrated. Ethernet data of 10 Mbit/s are transmitted from one network element 1 through an SDH (Synchronous Digital Hierarchy) network 2 to another network element 3. For illustrational purposes the network elements are here shown as multiplexers/demultiplexers, although they comprise much additional circuitry. The 10 Mbit/s data are mapped into five VC-12 containers constituting a VCG (Virtual Concatenation Group), which can be denoted as VC-12-5v. The five containers are called the members of the VCG. As illustrated, the five VC-12 containers are transmitted as individual containers through the network. In the receiving network element 3 the containers of the VCG can be recognized on their overhead, and a differential delay caused by difference in optical path length can be compensated, so that the data of the five containers can be combined again and the Ethernet data recreated.

Many services, such as the Ethernet mentioned, have variable requirements for bandwidth over time, and thus there is a need to be able to increase or decrease the capacity of a VCG link by adding or removing members from the group in order to meet the bandwidth needs of the application. Further, in case a failure is experienced in the link for a member in the network, the transmission capacity needs to be decreased to avoid that the whole VCG fails. These functions can be handled by the Link Capacity Adjustment Scheme (LCAS) for virtual concatenated signals as specified by the ITU-T Recommendation G.7042/Y.1305. This Recommendation defines the required states at the source and at the sink side of the link as well as the control information exchanged between both the source and the sink side of the link to enable the flexible resizing of the virtual concatenated signal.

Figure 2:
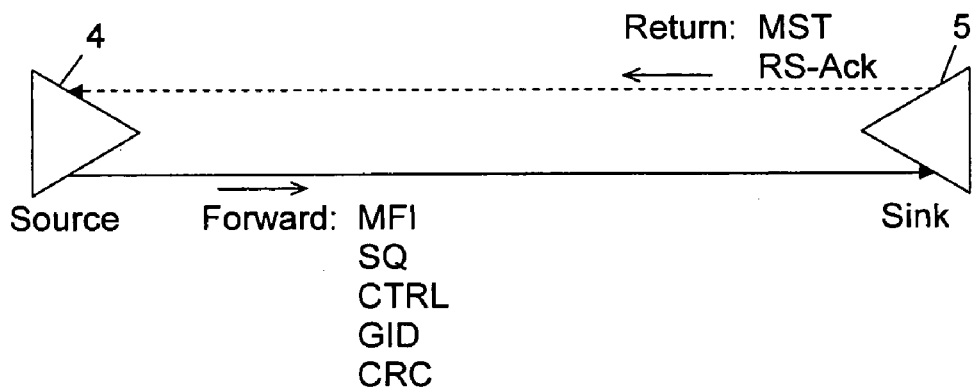
FIG. 2 shows information in control packets for a VCG member of a uni-directional link.

In LCAS, synchronization of changes in the capacity of the transmitter (source side) and the receiver (sink side) is achieved by control packets. Each control packet describes the state of a member of the link during the next control packet. Changes are sent in advance so that the receiver can switch to the new configuration at a predefined time. FIG. 2 shows an example of the allocation of information in the control packets exchanged between the source side 4 and the sink side 5 for a member of a uni-directional link. Each control packet consists of fields dedicated to specific functions. Control packets contain information sent from source to sink, i.e. the forward direction, and from sink to source, i.e. the return direction. It is noted that the payload data are sent in the forward direction, while the return direction is only used for the return control packets.

The information in the forward direction comprises a MultiFrame Indicator (MFI) field, a Sequence Indicator (SQ) field, a Control (CTRL) field, a Group Identification (GID) bit and a Cyclic Redundancy Check (CRC) field. The control field is used to transfer information from the source to the sink and member fail information from corresponding sink to source, and it provides commands indicating the status of the individual members of the group. Some of the possible forward commands or messages are $F_{NORM}$ (normal transmission), $F_{EOS}$ (End of Sequence, i.e. normal transmission for the member having the highest sequence number in the group), $F_{ADD}$ (this member is about to be added to the group), $F_{IDLE}$ (this member is not part of the group, or it is about to be removed) and $F_{DNU}$ (Do Not Use, which indicates that the payload of the relating container should not be used at the sink side).

The information in the return direction comprises a Member Status (MST) field and a Re-Sequence Acknowledge (RS-Ack) bit. The member status field reports the member status from sink to source with the two possible states OK and FAIL. Thus there are two return messages, $R_{OK}$ and $R_{FAIL}$. $R_{FAIL}$ is used when the sink side has detected a failure in the incoming data.

Figure 3:
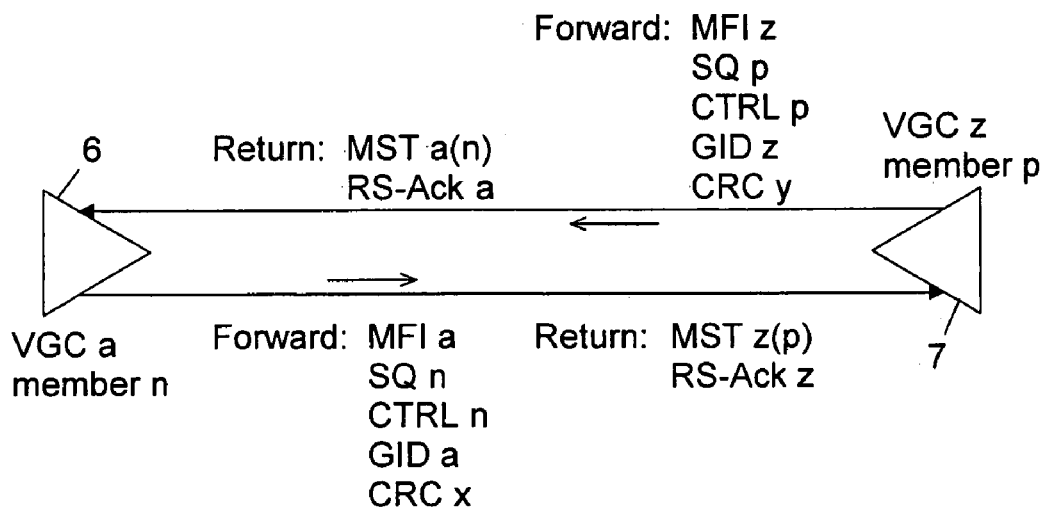
FIG. 3 shows information in control packets for a VCG member of a bi-directional link.

FIG. 3 shows an example of the allocation of information in the control packets exchanged between two network elements 6, 7 for one member of a bi-directional link, where each termination network element is a source for one direction as well as a sink for the other direction. Thus payload data as well as forward and return control packets are transmitted in both directions. In the direction from left to right payload data and forward control packets for member n of VCG a is transmitted, while payload data and forward control packets for member p of VCG z is transmitted in the direction from right to left. Corresponding return control packets are transmitted in the opposite directions.

The network elements of a link are controlled by one or more management systems. The management system can instruct network elements, i.e. source or sink side, to add members to or remove members from the group. This is done by sending management messages, such as $M_{ADD}$ and $M_{REMOVE}$.

Figure 4:
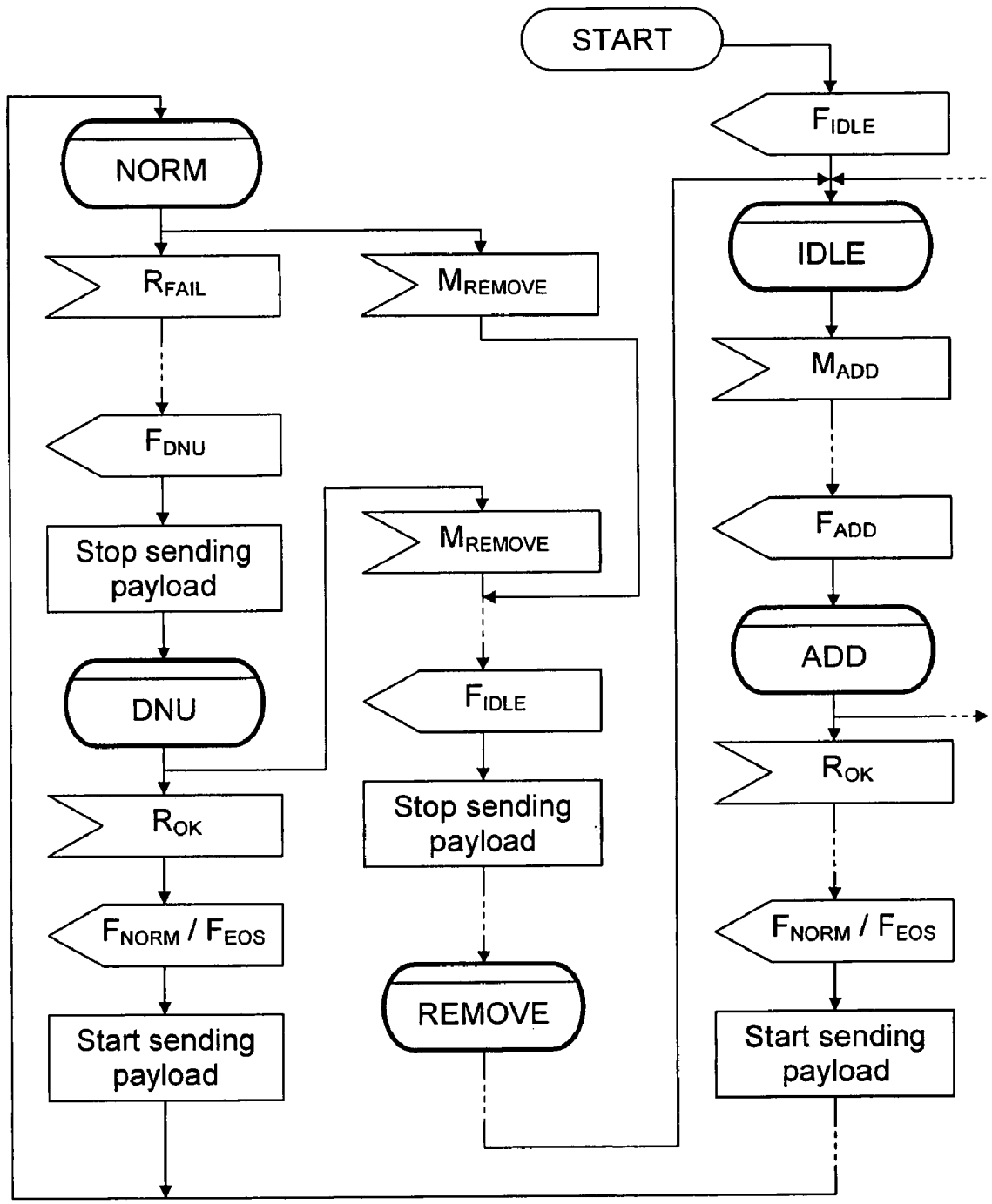
FIG. 4 shows a state diagram for a source end state machine.
Figure 5:
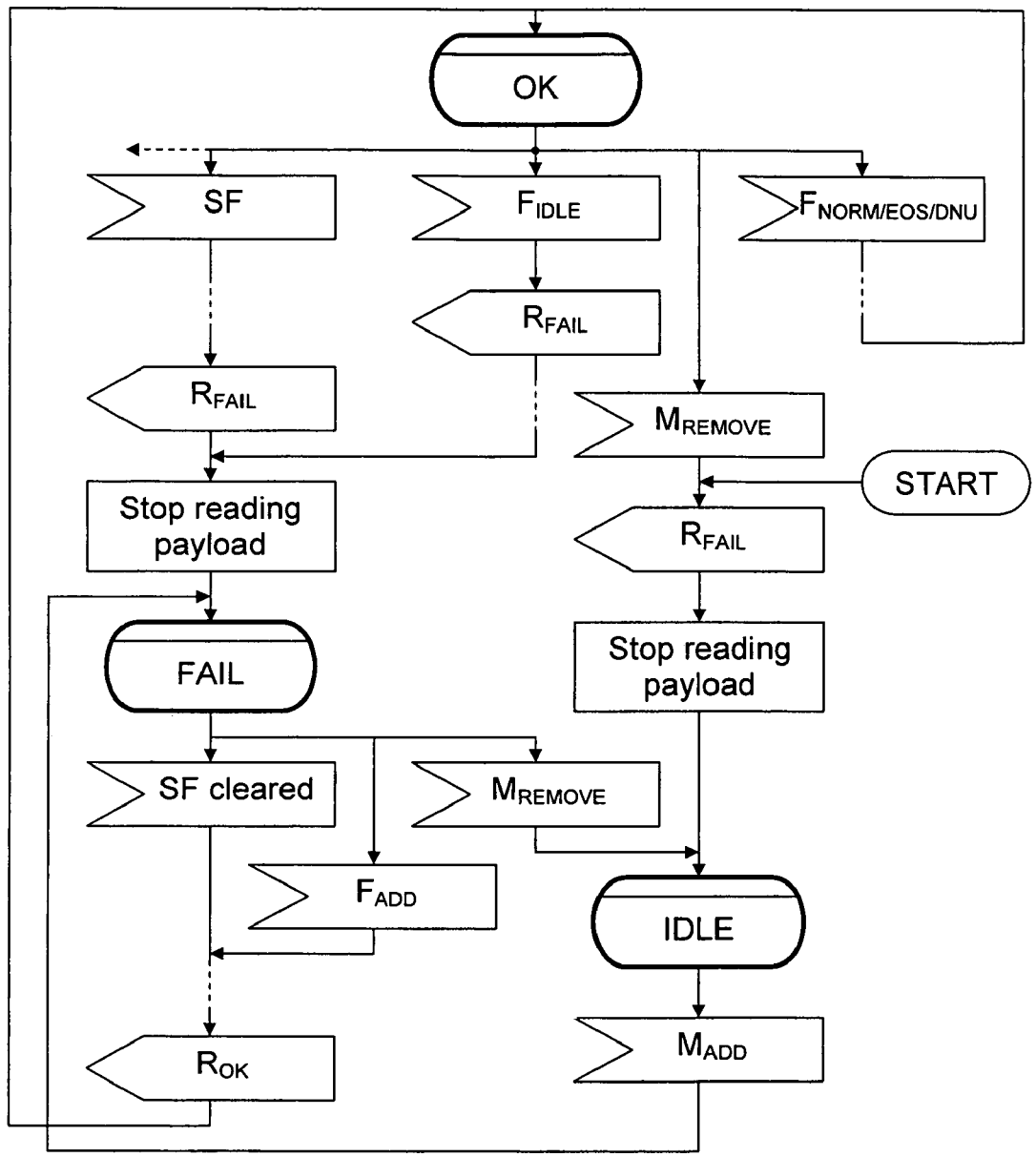
FIG. 5 shows a state diagram for a sink end state machine.

For each member of the group, i.e. each virtual container (VC), there is a state machine at the source end and a state machine in the sink end. FIGS. 4 and 5 show combined flow charts and state diagrams for the two state machines. These diagrams are specified in the LCAS Recommendation; however, FIGS. 4 and 5 have been simplified to show only those parts of the diagrams that are relevant for the understanding of the present invention. Removed parts are indicated with dashed lines in the transitions.

The state machine at the source end, which is shown in FIG. 4, can be in one of five states, i.e. IDLE (This VC is not provisioned to participate in the concatenated group), NORM (This VC is provisioned to participate in the concatenated group and no faults are detected for the VC), DNU (This VC is provisioned to participate in the concatenated group, but a fault has been detected for the VC (and reported to the source end)), ADD (This VC is in the process of being added to the concatenated group) and REMOVE (This VC is in the process of being deleted from the concatenated group).

The state machine at the sink end, which is shown in FIG. 5, can be in one of three states, i.e. IDLE (This VC is not provisioned to participate in the concatenated group), OK (The incoming signal for this VC experiences no hard failure condition or has received and acknowledged a request for addition of this VC) and FAIL (The incoming signal for this VC experiences some failure condition or an incoming request for removal of a VC has been received and acknowledged).

Figure 6:
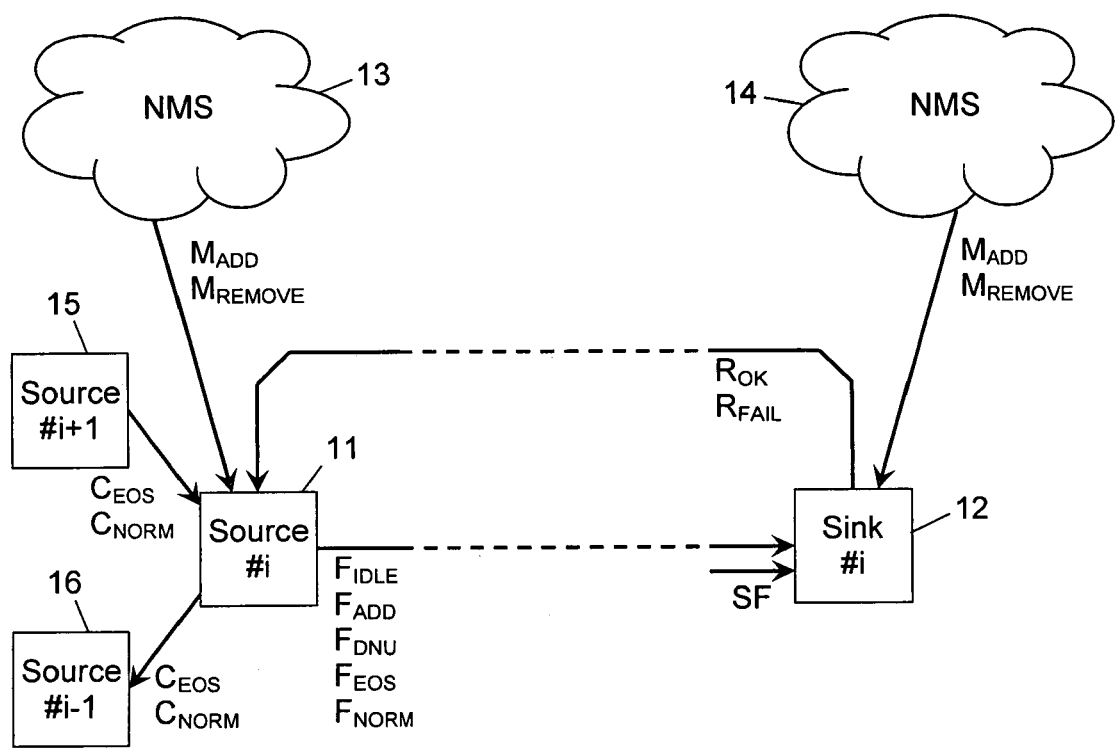
FIG. 6 shows interaction between the state machines of FIGS. 4 and 5.

These state machines run concurrently for all source and sink members of the group. The transitions between the states of the state diagrams are described in more detail below under use of some examples. The detailed interaction between the state machines is illustrated in FIG. 6, in which the forward messages $F_{NORM}$, $F_{EOS}$, $F_{ADD}$, $F_{IDLE}$ and $F_{DNU}$ may be sent from the source state machine 11 for member #i to the corresponding sink state machine 12, while the return messages $R_{OK}$ and $R_{FAIL}$ may be sent in the opposite direction. Another input to the sink state machine 12 is SF (Signal Fail), which indicates a failure condition in the incoming signal for this member.

Each of the two state machines 11 and 12 also receives inputs from a Network Management System (NMS) in the form of the management messages $M_{ADD}$ and $M_{REMOVE}$. In FIG. 6 the source state machine 11 receives messages from the NMS 13 and the sink state machine 12 from the NMS 14. This will typically be the situation when the two network elements connected by the link belong to different operator domains, but of course the two state machines may also receive their management messages from the same management system.

Further, on the source side messages $C_{EOS}$ and $C_{NORM}$ are also sent between the state machines of the different members of the group to indicate change of control words to ensure that the members are sequence numbered correctly. The physical channel of lowest number has no place to forward C messages. Correspondingly the C message input for the highest numbered physical channel is assumed to be $C_{EOS}$ (i.e. a request to signal $F_{EOS}$ if the channel is activated). The state changes in the source end state machine are based on the M and R messages only. The input C messages are then used—where required—when determining the output F and C messages.

Figure 7:
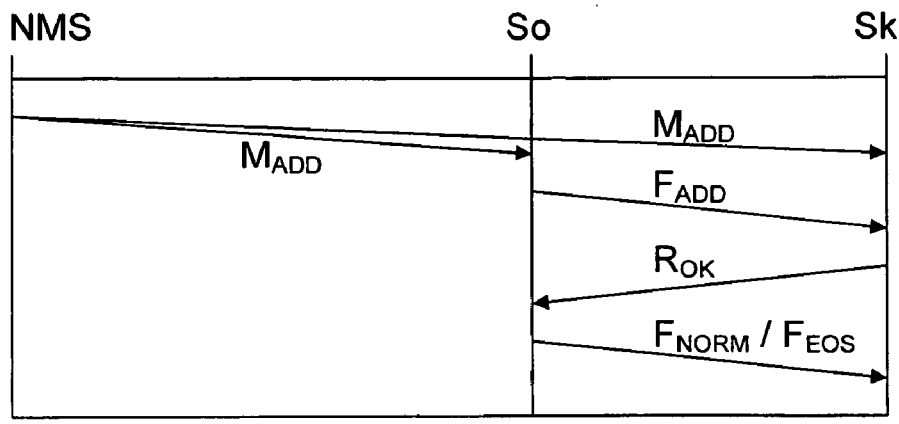
FIG. 7 shows a timing diagram for the addition of a new member to a VCG group.
Figure 8:
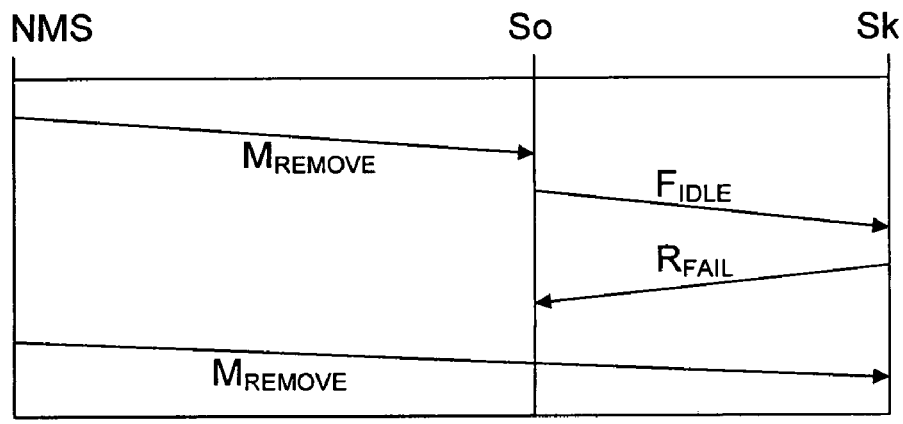
FIG. 8 shows a timing diagram for the permanent removal of a member from a VCG group.
Figure 9:
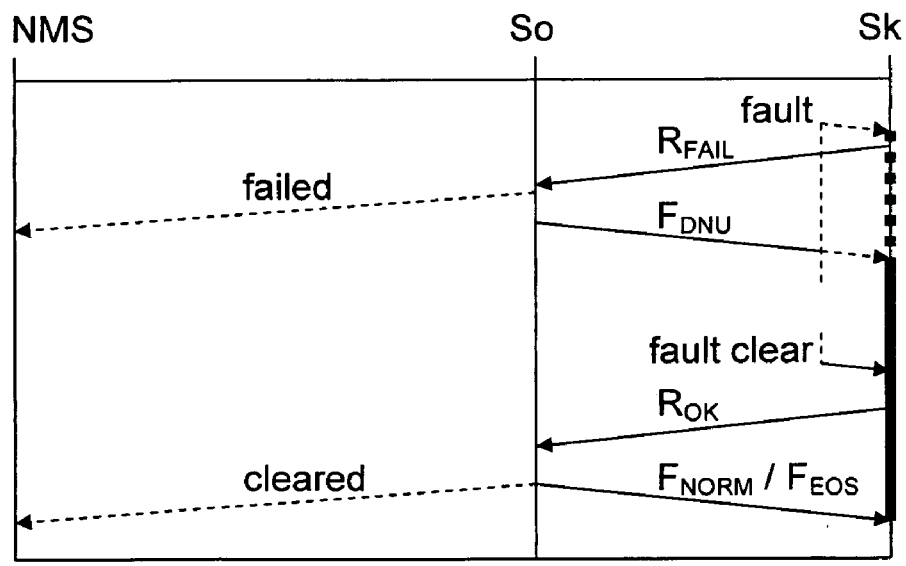
FIG. 9 shows a timing diagram for a temporary removal of a member from a VCG group due to a failure in the network.

The three main functions of the LCAS is to increase the VCG capacity by the addition of members, to decrease the VCG capacity by temporary removal of members due to a failure, and to decrease the VCG capacity by permanent removal of members due to a change in the bandwidth needs of the application. These three functions will be described in more detail below and at the same time used to illustrate the transitions between the states of the state diagrams in FIGS. 4 and 5. Corresponding timing diagrams are shown in FIGS. 7, 8 and 9. These diagrams are simplified and only intended to illustrate the main functions and messages for the member to be added or removed.

When the system is started, the source end state machine will send an $F_{IDLE}$ message and go to the IDLE state, in which it continues to send $F_{IDLE}$ messages. The sink end state machine will send $R_{FAIL}$ and go to the IDLE state, in which it continues to send $R_{FAIL}$ messages. This member is now ready to be added to the group.

When a new member should be added to the group an $M_{ADD}$ message is sent from the management system(s) to the source side state machine as well as the sink side state machine for the member to be added. The timing diagram is shown in FIG. 7. An $F_{ADD}$ command in the control field for the new member is sent in the forward control packet from the source to the sink, and the source enters the ADD state. The sink enters the FAIL state and waits for the $F_{ADD}$ to arrive. When this happens, it responds by sending $R_{OK}$ in the return control packet, and it enters the OK state. When the $R_{OK}$ message is received at the source, an $F_{NORM}$ or $F_{EOS}$ command is sent and payload data are inserted in the following containers for the new member. The source then enters the NORM state.

FIG. 8 shows the timing diagram for the situation where a member is removed permanently to adapt the VCG capacity to the bandwidth needs of the application. In this example the capacity reduction is initiated by sending a $M_{REMOVE}$ message from the management system to the source end state machine, which is supposed to be in the NORM state. As a response, the source sends an $F_{IDLE}$ command for the member to be removed, and the payload data are removed from the following containers. The source then enters the REMOVE state and, after a certain time, the IDLE state. When the $F_{IDLE}$ command is received at the sink, the sink end state machine responds by sending an $R_{FAIL}$ message in the return control packet. It also stops reading payload data, and then it enters the FAIL state. Finally, the management system sends a $M_{REMOVE}$ message to the sink, and upon reception of this message the sink end state machine enters the IDLE state. Thus the state machines in both ends are now in the IDLE state and the member has been removed from the group.

FIG. 9 shows the timing diagram for the situation where a failure in the network for a member of the group is detected at the sink. When this is detected (input SF on FIG. 6), the sink end state machine for that member will send $R_{FAIL}$ in the return control packet, stop reading the payload data and enter the FAIL state. However, it is noted that in the meantime the source continues sending payload data for the failed member. These data will be lost since the sink end no longer reads data, but they would probably be lost anyway due to the failure, or at least they would be unreliable. Upon detection of the $R_{FAIL}$ message the source end state machine will replace the $F_{NORM}$ or $F_{EOS}$ command for that member by a $F_{DNU}$ and remove payload data from the following containers. The source end state machine then enters the DNU state and the situation may be reported to the management system. In the DNU state the source end state machine continues sending $F_{DNU}$ messages, but due to the failure these messages may never reach the sink end.

When the defect causing the temporary removal is cleared this is detected at the sink, which will then send $R_{OK}$ for that member in the return control packet and enter the OK state. Upon detection of the $R_{OK}$ the source will replace the $F_{DNU}$ for that member by an $F_{NORM}$ or $F_{EOS}$ and start using the payload area of that member again. The source then enters the NORM state, and it may be reported to the management system that the failure has been cleared. It is noted that as soon as the fault is detected the sink will begin re-assembly of the VCG using only the remaining members. For the time until the $F_{DNU}$ message would have arrived at the sink the re-assembled data will be erroneous because the source still sends data on all members. From reception of the $F_{DNU}$ message and until $F_{NORM}$ is again received the source will send data only on the remaining members, i.e. the reconstructed data will be correct, but the bandwidth of the VCG will be reduced.

It is noted that if a permanent removal of an active member is initiated at the sink side instead of the source side as described above and illustrated in FIG. 8, this will result in a hit to the reconstructed data, because on reception of the management message $M_{REMOVE}$ the sink end state machine will stop reading the payload data, while the source end, similar to the failure situation just described, will continue to send payload data on this member until it finds out that the member can not be used any longer.

However, as mentioned before, there are situations where there is a need for initiating a permanent removal of an active member at the sink side instead of the source side, e.g. for bidirectional connections, and therefore such a removal should also be hitless to the payload data. This can be obtained as described below.

Figure 10:
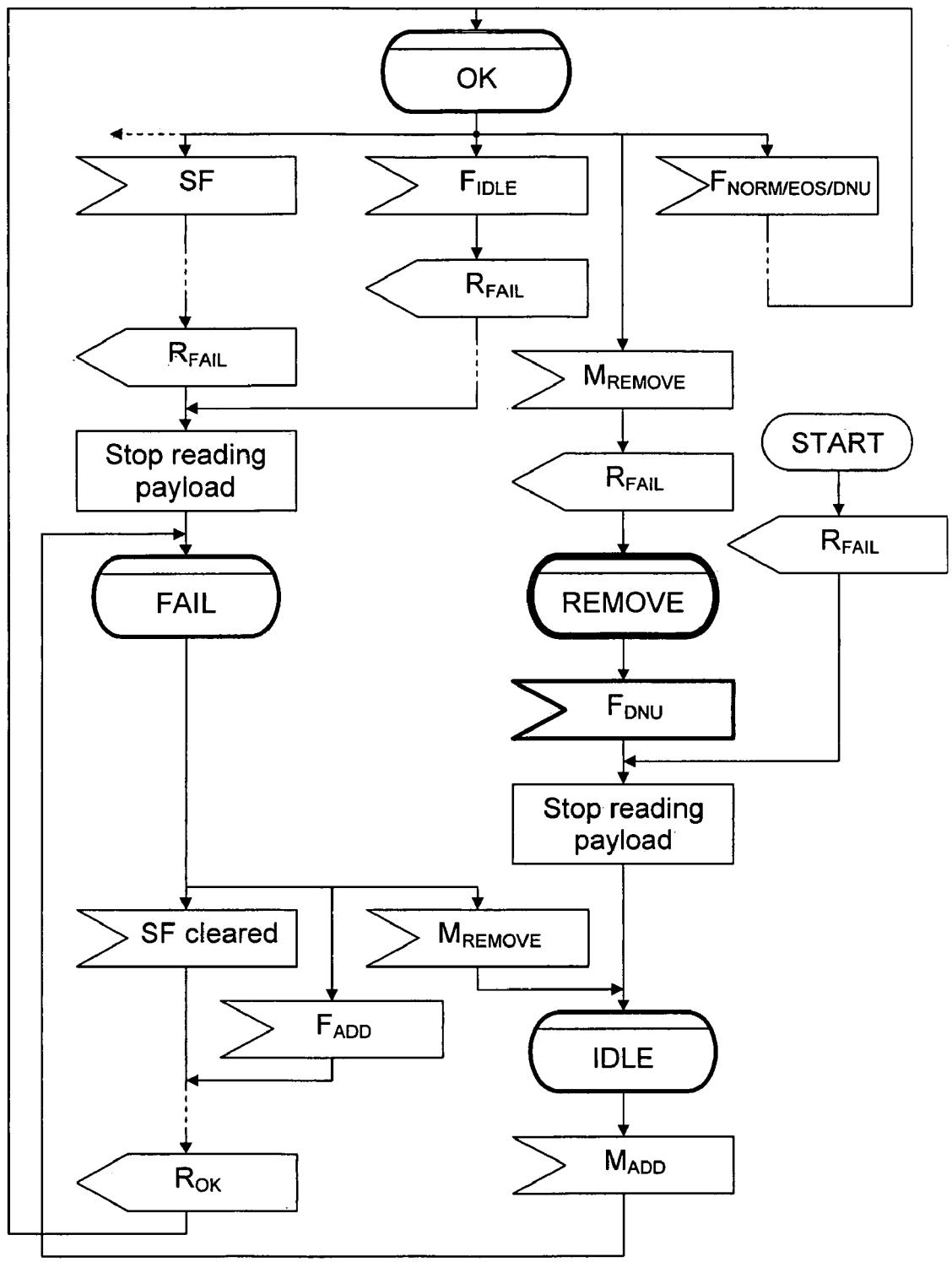
FIG. 10 shows the state diagram of FIG. 5 modified with a REMOVE state.
Figure 11:
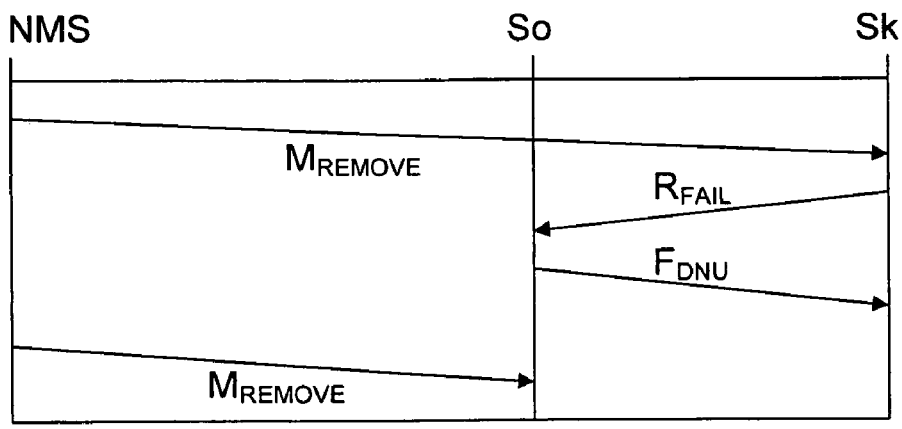
FIG. 11 shows a timing diagram corresponding to the state diagram of FIG. 10.

As shown in FIG. 10, the state diagram of the sink end state machine may be modified so that when a management message $M_{REMOVE}$ is received in the OK state, an $R_{FAIL}$ message is sent in the return control packet, and then the state machine enters a wait state, which is here called the REMOVE state. In this REMOVE state the sink continues reading the payload data. The inserted new functions are indicated in FIG. 10 with a thicker line. The corresponding timing diagram is shown in FIG. 11. Upon detection of the $R_{FAIL}$ message in the source end, the source end state machine will, without any changes and as it was described for the failure situation above, replace the $F_{NORM}$ or $F_{EOS}$ command for that member by an $F_{DNU}$ and remove payload data from the following containers. The source end state machine then enters the DNU state, and it is noted that the member has not yet been removed at the source end.

When the $F_{DNU}$ message is received at the sink end, which is in the REMOVE state and still reading payload data, the reading of payload data is stopped, and the state machine enters the IDLE state. Instead of waiting for the $F_{DNU}$ message, the sink end state machine could also just wait for the $F_{NORM}$ or $F_{EOS}$ message to be replaced by any other F message, which would indicate that the payload data are no longer valid, or a signal indicating that a failure or a fault has occurred, similar to the signal SF on FIG. 6. Finally, the management system sends an $M_{REMOVE}$ message to the source, and upon reception of this message the source end state machine enters the IDLE state. It also sends an $F_{IDLE}$ message, but since the sink end state machine is already in the IDLE state, this message has no effect. Thus the state machines in both ends are now in the IDLE state and the member has been removed from the group in a hitless manner. As an alternative to removing or deleting the member permanently from the concatenated group, the described idea may also be used when the member is temporarily disabled or excluded from the group, e.g. in case of re-routing operations in the network.

Figure 12:
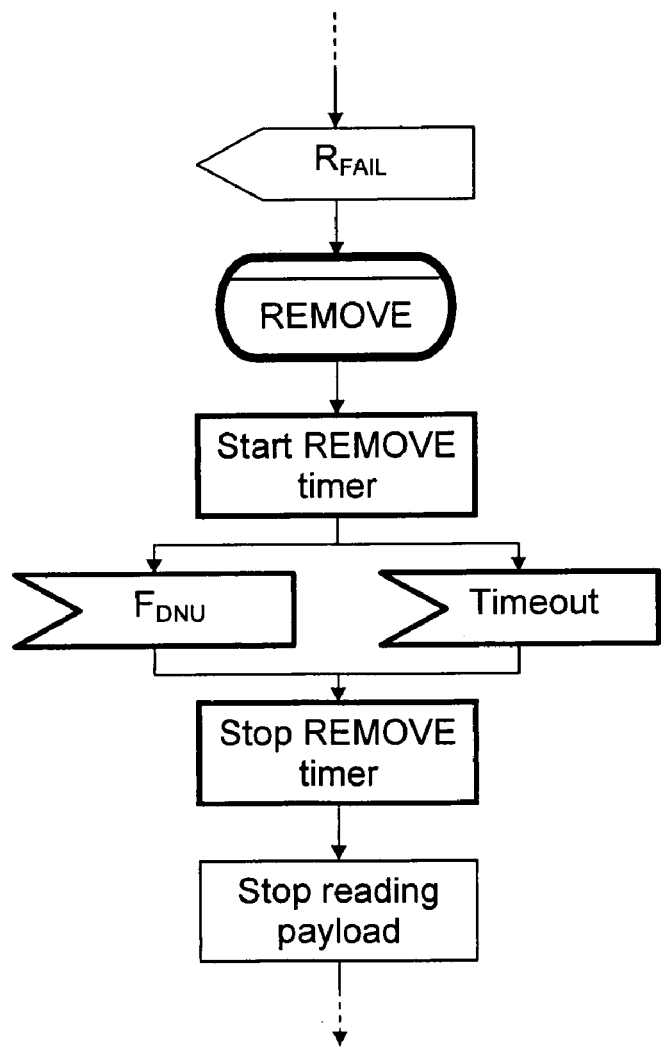
FIG. 12 shows a further modification to the state diagram of FIG. 5 with a time-out function.

In order to ensure that the sink end member can always be removed so that no dead-lock occurs, the procedure can be augmented with a time-out mechanism in the sink end, so that if the $F_{DNU}$ message is not received from the source end within a certain time after the $R_{FAIL}$ message was sent, it can be assumed that the source end has failed and the sink end member can be removed anyway. In principle, such a removal will not be hitless, but on the other hand, in this case the source end does not provide correct signalling in response to the $R_{FAIL}$ message, so the status of the received data is questionable anyway. FIG. 12 illustrates how the sink end state machine may be modified to include timeout function, so that the reading of the payload data is stopped if either the $F_{DNU}$ message is received or a certain time has lapsed after the $R_{FAIL}$ message was sent.

It can be noted that the functions described above are implemented in the sink end, and thus they require no modifications of the source end state machine.

It is also noted that the modifications of the state diagram shown in FIGS. 10 and 12 are only examples of how the sink end state machine can be modified to obtain the desired function, i.e. that the sink end continues with the reading of the payload data while it waits for the $F_{DNU}$ message to arrive as a response to the $R_{FAIL}$ message. Further, some additional modifications may be made to the sink end state machine.

Thus the purpose of FIGS. 10 and 12 is only to illustrate an example of how the function could be implemented.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of reducing the transport capacity of a Virtual Concatenation Group that is transported from a source side to a sink side in a telecommunications network under control of a Link Capacity Adjustment Scheme (LCAS), wherein said Virtual Concatenation Group comprises a number of link members, in which payload data to be received at the sink side is transmitted, the method comprising:

transmitting, in response to a received management command at the sink side instructing the sink side to remove one of said link members from said Virtual Concatenation Group, a first control message from the sink side to the source side comprising a fail message for said one link member, while continuing reception of payload data for said one link member;

transmitting, in response to receiving said first control message at the source side, a second control message from the source side to the sink side indicating that payload data of said one link member shall not be used, while discontinuing transmission of payload data for said one link member; and discontinuing, in response to receiving said second control message at the sink side, the reception of payload data for said one link member and removing or disabling said one link member from said Virtual Concatenation Group on the sink side.

2. A method according to claim 1, further comprising:

activating a timing circuit in response to the transmission of said first control message;

providing, if said second control message is not received at the sink side within a specified time, a time-out signal from said timing circuit; and in response to said time-out signal, discontinuing the reception of payload data for said one link member and removing or disabling said one link member from said Virtual Concatenation Group on the sink side.

3. A method according to claim 1, wherein said first control message is a return control message and said second control message is a forward control message.

4. A method according to claim 1, wherein the telecommunications network is a Synchronous Digital Hierarchy (SDH) network.

5. A method according to claim 1, wherein the telecommunications network is an Optical Transport Network (OTN).

6. A network element configured to function as a sink side in a telecommunications network, in which a Virtual Concatenation Group can be transported from a source side to said sink side under control of a Link Capacity Adjustment Scheme (LCAS), wherein said Virtual Concatenation Group comprises a number of link members, in which payload data to be received at the sink side is transmitted, the network element comprising:

means for transmitting, in response to a received management command at the sink side instructing the sink side to remove one of said link members from said Virtual Concatenation Group, a first control message from the sink side to the source side, the first control message comprising a fail message for said one link member, while continuing reception of payload data for said one link member, the first control message known to cause the source side to discontinue transmission of payload data for said one link member and send a second control message indicating that payload data of said one link member shall not be used; and means for discontinuing, in response to said second control message, the reception of payload data for said one link member and removing or disabling said one link member from said Virtual Concatenation Group.

7. A network element configured to function as a sink side in a telecommunications network, in which a Virtual Concatenation Group is transported from a source side to said sink side under control of a Link Capacity Adjustment Scheme (LCAS), wherein said Virtual Concatenation Group comprises a number of link members, in which payload data to be received at the sink side is transmitted, the network element comprising:

a transmission module to transmit, in response to a received management command at the sink side instructing the sink side to remove one of said link members from said Virtual Concatenation Group, a first control message from the sink side to the source side, the first control message comprising a fail message for said one link member, while continuing reception of payload data for said one link member, the first control message known to cause the source side to discontinue transmission of payload data for said one link member and send a second control message indicating that payload data of said one link member shall not be used;

a discontinuation module to discontinue, in response to said second control message, the reception of payload data for said one link member; and a removal module to remove said one link member from said Virtual Concatenation Group.

8. A network element according to claim 7, further comprising a timing circuit arranged to be activated in response to the transmission of said first control message and to provide a time-out signal, if said second control message is not received within a specified time; and that the network element is further arranged to, in response to said time-out signal, discontinue the reception of payload data for said one link member and remove or disable said one link member from said Virtual Concatenation Group.

9. A network element according to claim 7, further comprising a state machine having a state, which can be entered by the transmission of said first control message, and in which the machine is arranged to wait for the arrival of said second control message.

10. A network element according to claim 7, wherein said first control message is a return control message and said second control message is a forward control message.

11. A network element according to claim 7, wherein the telecommunications network is a Synchronous Digital Hierarchy (SDH) network.

12. A network element according to claim 7, wherein the telecommunications network is an Optical Transport Network (OTN).

* * * * *

UNITED STATES PATENT AND TRADEMARK OFFICE
CERTIFICATE OF CORRECTION

| | | |
|---|---|---|
| PATENT NO. | : 7,616,558 B2 | Page 1 of 1 |
| APPLICATION NO. | : 11/291463 | |
| DATED | : November 10, 2009 | |
| INVENTOR(S) | : Anne Christensen and Flemming Gerdstroem | |

It is certified that error appears in the above-identified patent and that said Letters Patent is hereby corrected as shown below:

On the cover page item (75) of the patent the 2nd inventor's name is spelled incorrectly.

please delete "Flemming Gerdstrom".

please insert -- Flemming Gerdstroem --.

Signed and Sealed this

Twentieth Day of April, 2010

David J. Kappos
*Director of the United States Patent and Trademark Office*

UNITED STATES PATENT AND TRADEMARK OFFICE
CERTIFICATE OF CORRECTION

PATENT NO. : 7,616,558 B2
APPLICATION NO. : 11/291463
DATED : November 10, 2009
INVENTOR(S) : Christensen et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 904 days.

Signed and Sealed this

Nineteenth Day of October, 2010

David J. Kappos
*Director of the United States Patent and Trademark Office*